US012036569B2

(12) United States Patent
Zimmerman et al.

(10) Patent No.: US 12,036,569 B2
(45) **Date of Patent: *Jul. 16, 2024**

(54) AUTOMATIC REVERSIBLE ARC SPRINKLER

(71) Applicant: NELSON IRRIGATION CORPORATION, Walla Walla, WA (US)

(72) Inventors: Mathew L. Zimmerman, Walla Walla, WA (US); Craig B. Nelson, Walla Walla, WA (US); Chad D. Leinweber, Walla Walla, WA (US); Joseph Daniel Sinden, Walla Walla, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 439 days.

This patent is subject to a terminal disclaimer.

(21) Appl. No.: 17/381,356

(22) Filed: Jul. 21, 2021

(65) Prior Publication Data

US 2021/0346902 A1 Nov. 11, 2021

Related U.S. Application Data

(63) Continuation of application No. 16/517,987, filed on Jul. 22, 2019, now Pat. No. 11,090,671.

(51) Int. Cl.
*B05B 12/02* (2006.01)
*B05B 3/08* (2006.01)

(52) U.S. Cl.
CPC ................ *B05B 12/02* (2013.01); *B05B 3/08* (2013.01)

(58) Field of Classification Search
CPC ... B05B 3/0472; B05B 3/0477; B05B 3/0481; B05B 12/02; B05B 3/08
(Continued)

(56) References Cited

U.S. PATENT DOCUMENTS 4,262,812 A 4/1981 Bremenkamp
4,582,257 A 4/1986 Siegler
(Continued)

FOREIGN PATENT DOCUMENTS

EP 3 153 238 4/2017
EP 3 421 137 10/2019
(Continued)

OTHER PUBLICATIONS

Extended European Search Report dated Dec. 4, 2020 issued in European Patent Application No. 20177499.9, 8 pp.

*Primary Examiner* — Christopher S Kim
(74) *Attorney, Agent, or Firm* — NIXON & VANDERHYE P.C.

(57) ABSTRACT

An automatic reversible arc assembly for a sprinkler includes a pair of primary stop members circumferentially spaced from each other by a first amount, and a pair of secondary stop members circumferentially spaced from each other by a second amount, different from the first amount. The primary stop members and the secondary stop members are coupled together and define a pivot assembly pivotable between a first position and a second position. A timer module cooperable with the pivot assembly is configured to hold the pivot assembly in the first position for a selectable period of time, after which the timer module enables the pivot assembly to pivot to the second position. The primary stop members are active in the first position, and the secondary stop members are active in the second position.

20 Claims, 6 Drawing Sheets

(58) Field of Classification Search
USPC ........................................... 239/70, 230–233
See application file for complete search history.

(56) References Cited

U.S. PATENT DOCUMENTS

| | | | |
|---|---|---|---|
| 4,723,714 | A | 2/1988 | Lucas |
| RE33,746 | E | 11/1991 | Lucas |
| 5,711,490 | A | 1/1998 | Hansinger |
| 5,762,270 | A | 6/1998 | Kearby et al. |
| 6,607,147 | B2 | 8/2003 | Schneider et al. |
| 6,786,428 | B1 | 9/2004 | Huang |
| 7,182,274 | B2 | 2/2007 | Nies |
| 8,490,644 | B2 | 7/2013 | Strachan |
| 9,120,111 | B2 | 9/2015 | Nations et al. |
| 9,156,043 | B2 | 10/2015 | Walker |
| 11,090,671 | B2 * | 8/2021 | Zimmerman ......... B05B 3/0477 |
| 2008/0179421 | A1 | 7/2008 | Nelson et al. |

FOREIGN PATENT DOCUMENTS

| | | | |
|---|---|---|---|
| IT | 20 110 282 | A1 | 5/2013 |
| IT | 20 110 283 | A1 | 5/2013 |

* cited by examiner

AUTOMATIC REVERSIBLE ARC SPRINKLER

CROSS-REFERENCES TO RELATED APPLICATIONS

This application is a continuation of U.S. patent application Ser. No. 16/517,987, filed Jul. 22, 2019, pending, the entire content of which is herein incorporated by reference.

STATEMENT REGARDING FEDERALLY SPONSORED RESEARCH OR DEVELOPMENT (NOT APPLICABLE)

BACKGROUND

The invention relates to an automatic reversible arc assembly for a sprinkler and, more particularly, to an automatic reversible arc assembly with selectively positionable stops for controlling a sprinkler arc.

There are many times that irrigators utilizing traveling hose reels are irrigating adjacent public roads in which they cannot get water on. The current solution is to start irrigating a fixed distance away from the edge of the field so that the spray does not go onto the road. This solution, however, creates corner areas in the fields that do not get irrigated.

BRIEF SUMMARY

The automatic reversible arc assembly of the described embodiments allows the irrigator to place the sprinkler adjacent a public road and operate the sprinkler in a 180-degree arc facing back into the field, away from the road. This allows all the field to be irrigated by the hose reel without getting water on the public road. The irrigator sets a timer that will reverse the sprinkler from, for example, a 180-degree arc to, for example, a 270-degree arc in the opposite direction. The timer is set by the irrigator so that the sprinkler will reverse directions far enough from the edge of the field so as to prevent water from spraying on the adjacent road. After reversing, the sprinkler transitions into a larger arc, e.g., 270 degrees, facing in the opposite direction. The 270-degree arc is exemplary, and other dimensions may be suitable. The 270-degree arc is preferable so that the sprinkler does not irrigate over the traveling hose and create wheel tracks from the cart.

In an exemplary embodiment, an automatic reversible arc assembly for a sprinkler with a base cover and a direction change arm includes a first rotary stop arm pivotably connectable to the sprinkler, and a first primary stop member fixed to the first rotary stop arm adjacent a distal end of the first rotary stop arm. A second rotary stop arm is pivotably connectable to the sprinkler, and a second primary stop member is fixed to the second rotary stop arm adjacent a distal end of the second rotary stop arm. The first and second primary stop members are circumferentially spaced from each other by a first amount. A stop assembly mounting plate is connected between the first and second rotary stop arms at proximal ends of the first and second rotary stop arms. First and second secondary stop members are coupled with the stop assembly mounting plate and are circumferentially spaced from each other by a second amount different from the first amount. A latch pin is securable to the base cover of the sprinkler, and a timer module coupled to and pivotable with the first rotary stop arm includes a timer latch that is selectively engageable with the latch pin. The first and second rotary stop arms are pivotable between a first position in which the timer latch is engaged with the latch pin and in which the first and second primary stop members are active, and a second position in which the timer latch is disengaged from the latch pin and in which the first and second secondary stop members are active.

The first and second rotary stop arms may be biased toward the second position. The assembly may also include two ring cover pivot assemblies securable to the base cover of the sprinkler and respectively engaging the first and second rotary stop arms. The ring cover pivot assemblies may each include a torsion spring respectively connected to the first and second rotary stop arms, and at least one of the ring cover pivot assemblies may include the latch pin. The assembly may still further include a pair of ring mounts clam shell attachable to each other over the base cover of the sprinkler with the two ring cover pivot assemblies interposed therebetween.

In some embodiments, the first amount may span an arc of the base cover on one side of the base cover, and the second amount may span an arc of the base cover on an opposite side of the base cover. In this context, the arc of the base cover on the opposite side of the base cover spanned by the second amount may at least partially overlap the arc of the base cover on the one side of the base cover spanned by the first amount. The first amount may span an arc encompassing 180 degrees, and the second amount may span an arc encompassing up to 320 degrees.

The first and second secondary stop members may be adjustable on the stop assembly mounting plate such that the second amount is selectively adjustable.

The first and second secondary stop members may be unidirectional. In this context, the first and second secondary stop members may be each pivotable between an upright position and a deflected position, where the first and second secondary stop members may be biased toward the upright position.

In another exemplary embodiment, an automatic reversible arc assembly for a sprinkler includes a pair of primary stop members circumferentially spaced from each other by a first amount, and a pair of secondary stop members circumferentially spaced from each other by a second amount, different from the first amount. The primary stop members and the secondary stop members are coupled together and define a pivot assembly pivotable between a first position and a second position. A timer module cooperable with the pivot assembly is configured to hold the pivot assembly in the first position for a selectable period of time, after which the timer module enables the pivot assembly to pivot to the second position. The primary stop members are active in the first position, and the secondary stop members are active in the second position. In some embodiments, the pivot assembly may be biased toward the second position.

In yet another exemplary embodiment, a method for automatically modifying a sprinkler arc with an automatic reversible arc assembly includes the steps of pivoting the pivot assembly into the first position such that the primary stop members are active; securing the pivot assembly in the first position with a timer module; setting a time period on the timer module, the timer module holding the pivot assembly in the first position for the time period; and after expiration of the time period, the timer module releasing the pivot assembly to pivot the pivot assembly to the second position such that the secondary stop members are active.

BRIEF DESCRIPTION OF THE DRAWINGS

These and other aspects and advantages will be described in detail with reference to the accompanying drawings, in which.

DETAILED DESCRIPTION

With reference to the drawings, the automatic reversible arc assembly 10 is shown mounted on a sprinkler 100 including a base cover 102 and a direction change arm 104. The exemplary sprinkler shown in the figures is the "BIG GUN®" sprinkler manufactured by Nelson Irrigation Corporation of Walla Walla, Washington. The automatic reversible arc assembly 10 is equally applicable to any sprinkler type that includes a base cover or the like for securing the assembly and a direction change arm.

Figure 6:
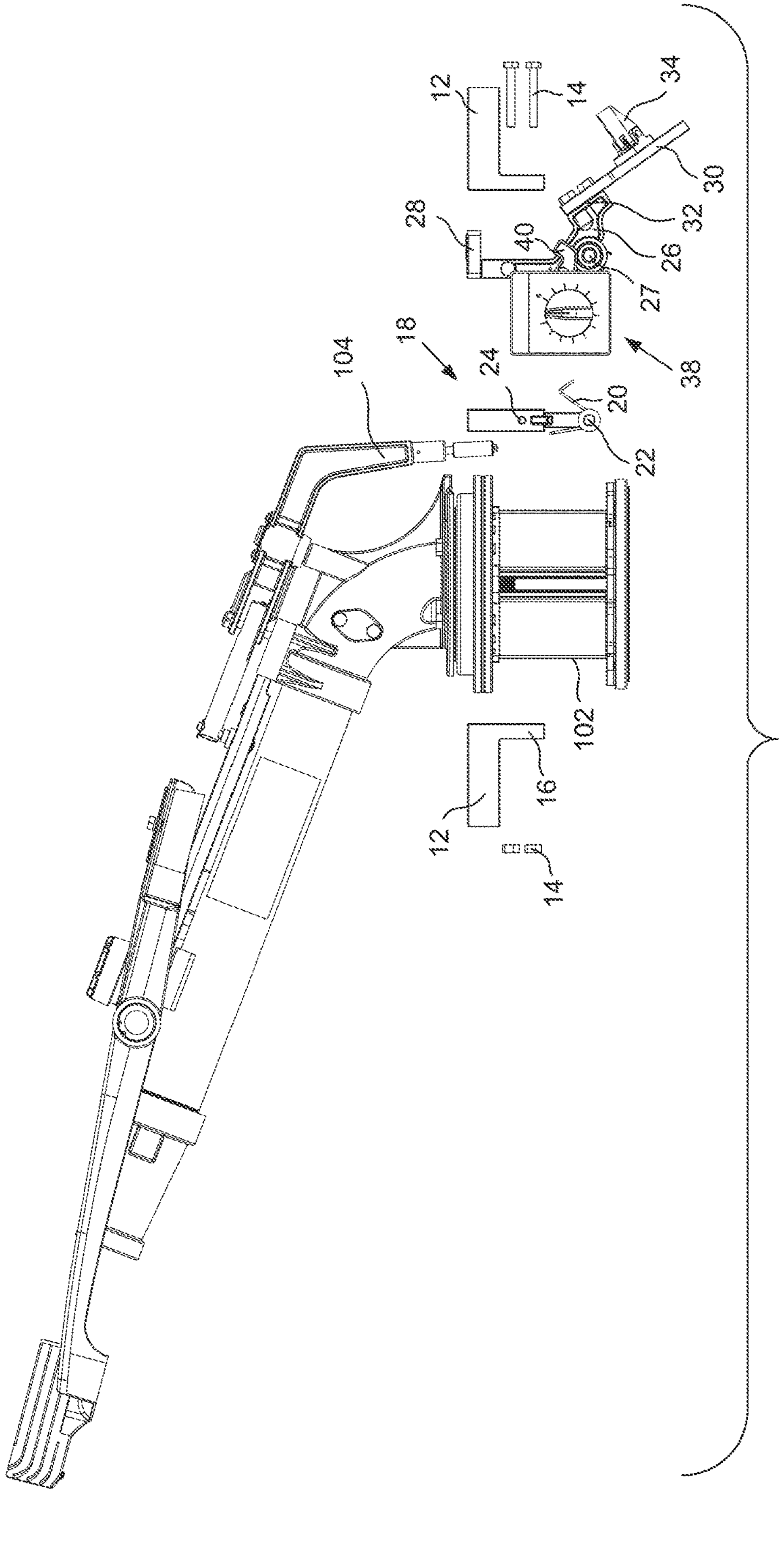
FIG. 6 is an exploded view showing the components of the assembly.

The assembly 10 includes a pair of ring mounts 12 that are clam shell attachable to each other over the base cover 102 of the sprinkler via a suitable connector 14. (See FIG. 6.) The ring mounts 12 include a downwardly extending tab member 16 at circumferential ends thereof through which the connectors 14 are secured. A pair of ring cover pivot assemblies 18 are respectively secured on opposite sides of the base cover 102 sandwiched between the tabs 16. The connectors 14 extend through openings in the tabs 16 and the ring cover pivot assemblies 18.

The ring cover pivot assemblies 18 include a torsion spring 20 mounted on a pivot post 22. At least one of the ring cover pivot assemblies 18 also includes a latch pin 24 that is cooperable with the timer module 38 (discussed in more detail below).

The assembly 10 includes first and second rotary stop arms 26 that are secured to and pivotable on respective pivot posts 22 via a pivot connection 27. The torsion springs 20 are connected between the ring cover pivot assemblies 18 and the rotary stop arms 26. Primary stop members 28 are fixed to the rotary stop arms 26 adjacent distal ends of the rotary stop arms 26. The primary stop members 28 secured at ends of respective rotary stop arms 26 are circumferentially spaced from each other by a first amount. In the embodiment shown, the ring cover pivot assemblies 18 are essentially diametrically opposed on opposite sides of the base cover, and as such, the first amount may be 180 degrees.

Figure 3:
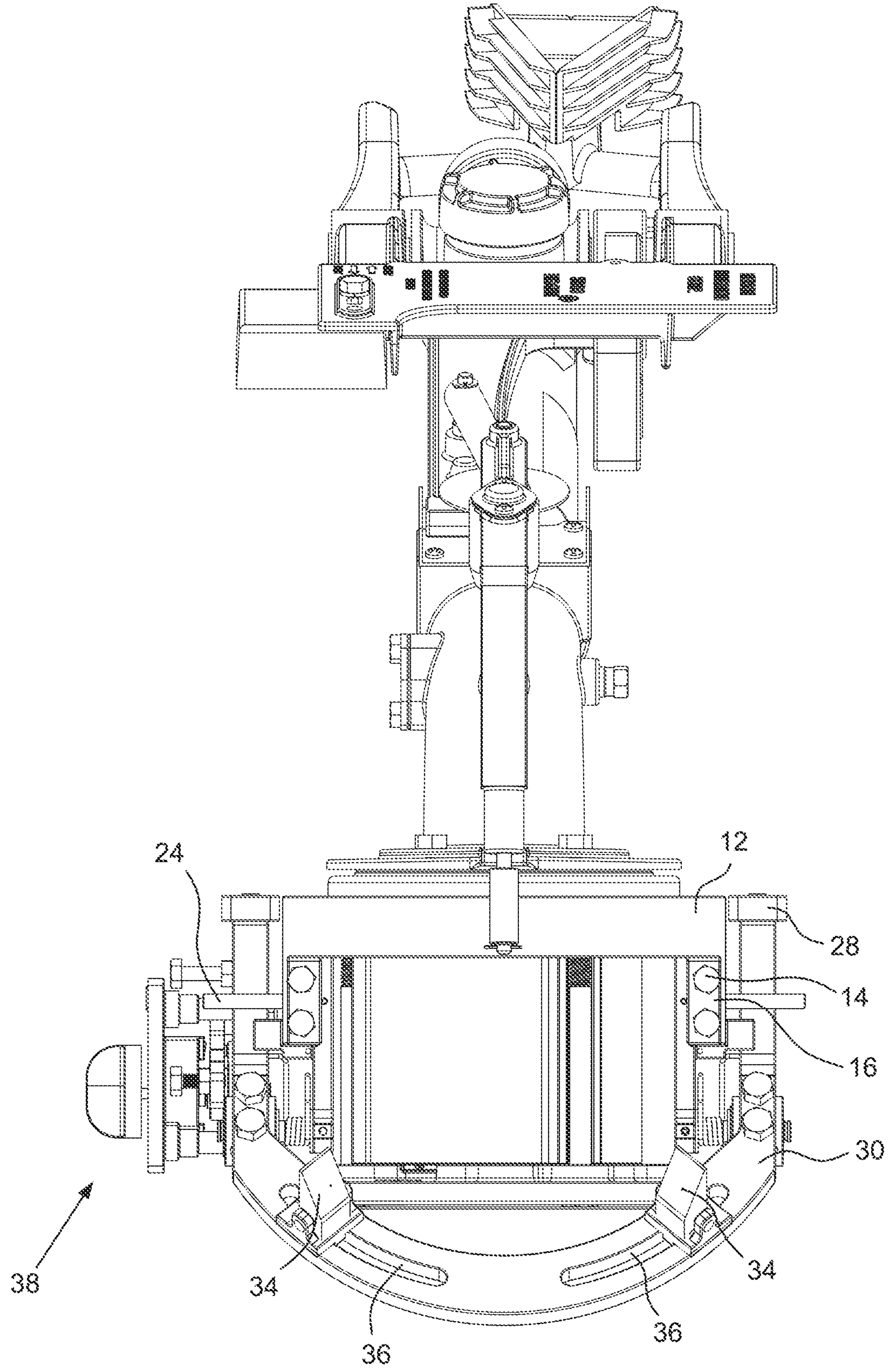
FIG. 3 is an end view with the assembly in the first position.

A stop assembly mounting plate 30 is connected between the rotary stop arms 26 at proximal ends of the rotary stop arms 26. In an exemplary construction, the rotary stop arms 26 include a platform 32 or the like at the proximal ends thereof, and the stop assembly mounting plate 30 is secured in place on the platforms 32 by a bolt or the like. As shown in FIG. 3, the stop assembly mounting plate 30 may be a curved plate member extending around the base cover 102 and connected between the proximal ends of the rotary stop arms 26.

A pair of secondary stop members 34 are mounted adjustably in slots 36 in the stop assembly mounting plate 30. The secondary stop members 34 are circumferentially spaced from each other by a second amount, different from the first amount. The sprinkler is displaceable in a circle, where the first amount spans the arc on one side of the circle, and the second amount spans an arc on the opposite side of the circle. In an exemplary application, the secondary stop members 34 are circumferentially spaced about 270 degrees, although as noted, the secondary stop members 34 are adjustable in the slots 36 in the stop assembly mounting plate 30. The secondary stop members 34 may be adjusted such that the second amount spans an arc between 250-320 degrees. It is also possible to remove the stops and go to a 360-degree rotation if that is desired.

The timer module 38 is coupled to and pivotable with one of the rotary stop arms 26. The timer module 38 includes a timer latch 40 that is selectively engageable with the latch pin 24. Any suitable timer mechanism/module may be utilized wherein the timer latch 40 is caused to disengage the latch pin 24 upon expiration of the set time period. For example, the timer module may connect to a Geneva mechanism including a timer pin rotatable according to the preset time duration. As the time expires, the timer pin is displaced into a slot in the timer latch 40, where further rotation via the Geneva mechanism causes the pin engaged in the slot to displace the timer latch 40 into a retracted position. In the retracted position, the timer latch 40 is released from the latch pin 24, and the assembly 10 is pivoted to the second position via the torsion springs 20. Other suitable timer mechanisms may be used including electro-mechanical or electronic versions with actuators, etc.

Figure 4:
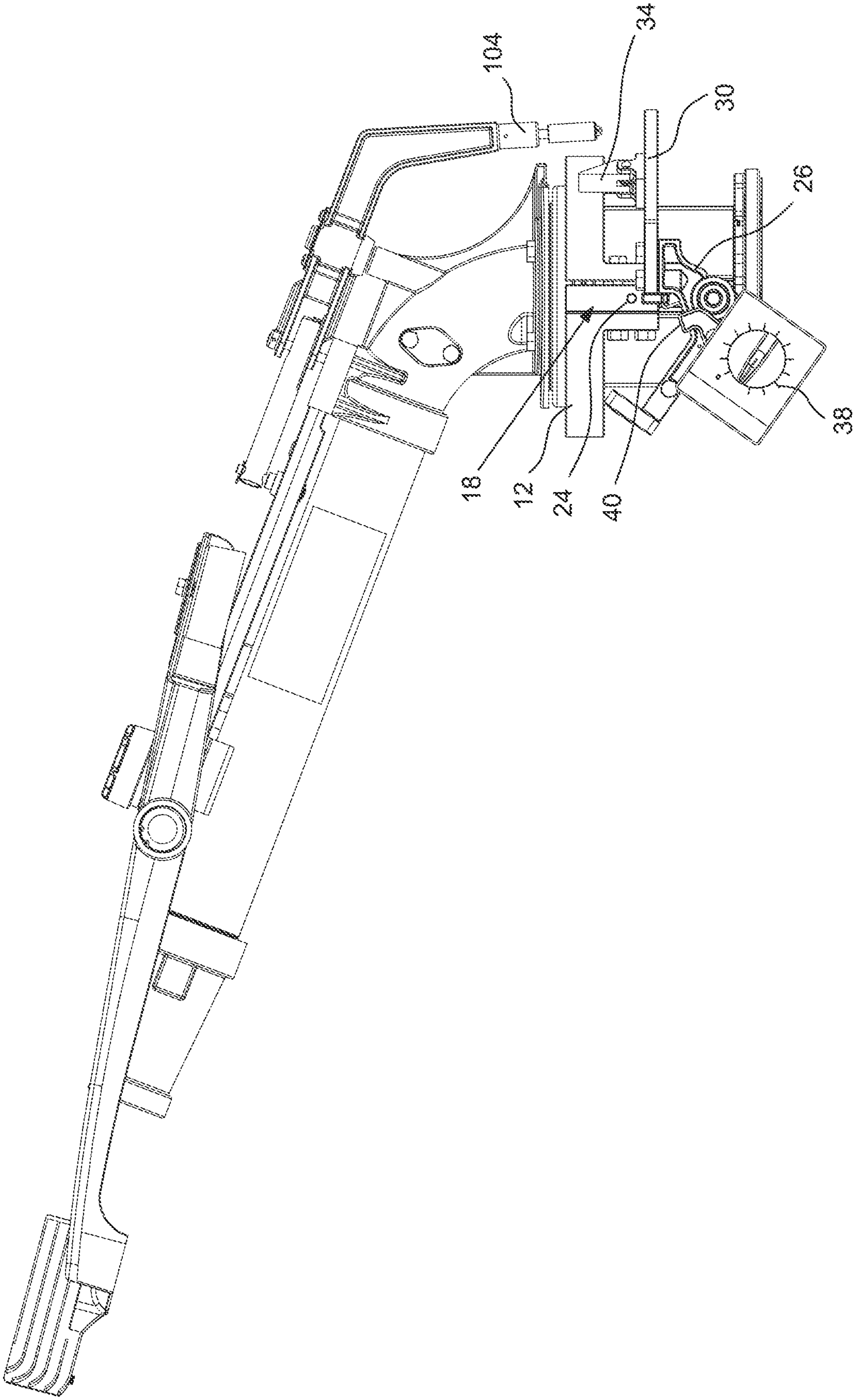
FIG. 4 is a side view of the sprinkler with the assembly in a second position.
Figure 5:
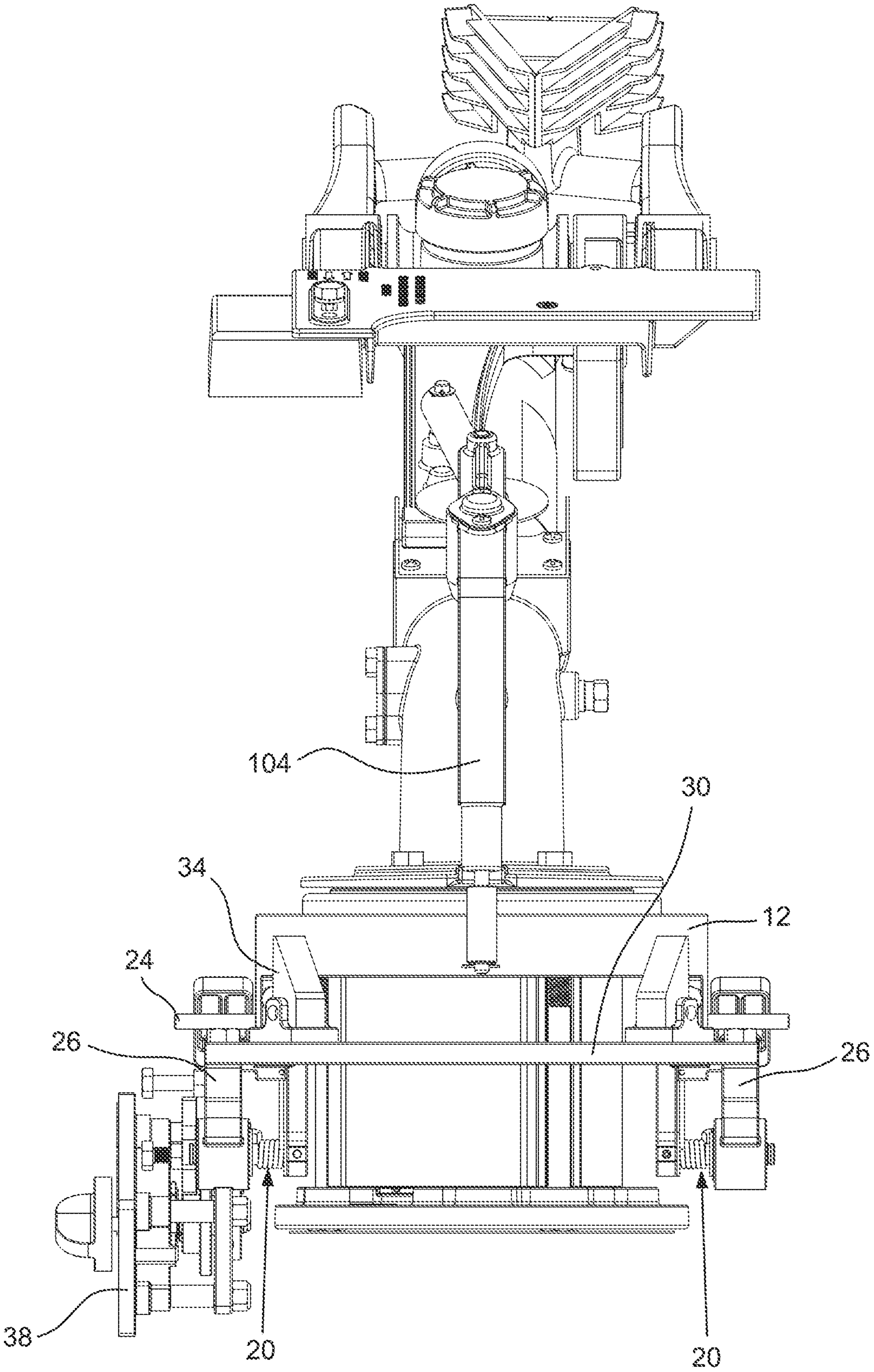
FIG. 5 is an end view with the assembly in the second position.

The rotary stop arms 26 are pivotable between a first position in which the timer latch is engaged with the latch pin and in which the primary stop members 28 are active (FIGS. 1-3), and a second position in which the timer latch 40 is disengaged from the latch pin 24 and in which the secondary stop members 34 are active (FIGS. 4 and 5).

As noted, the torsion springs 20 are respectively interposed between the ring cover pivot assemblies 18 and the rotary stop arms 26. The torsion springs 20 bias the rotary stop arms 26, and thus the stop assembly mounting plate 30, toward the second position (FIGS. 4 and 5).

Figure 1:
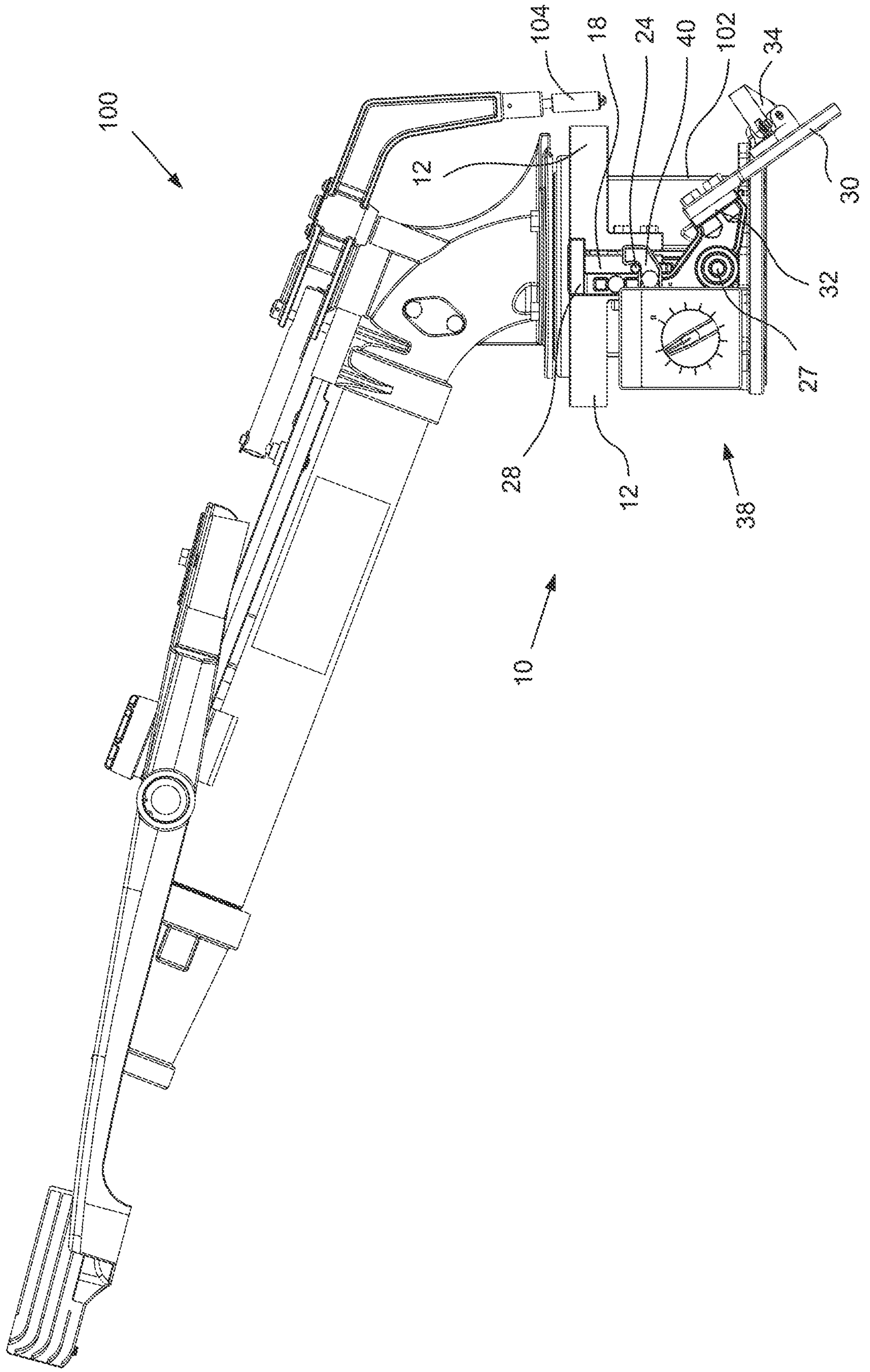
FIG. 1 is a side view of a sprinkler including an automatic reversible arc assembly in a first position.
Figure 2:
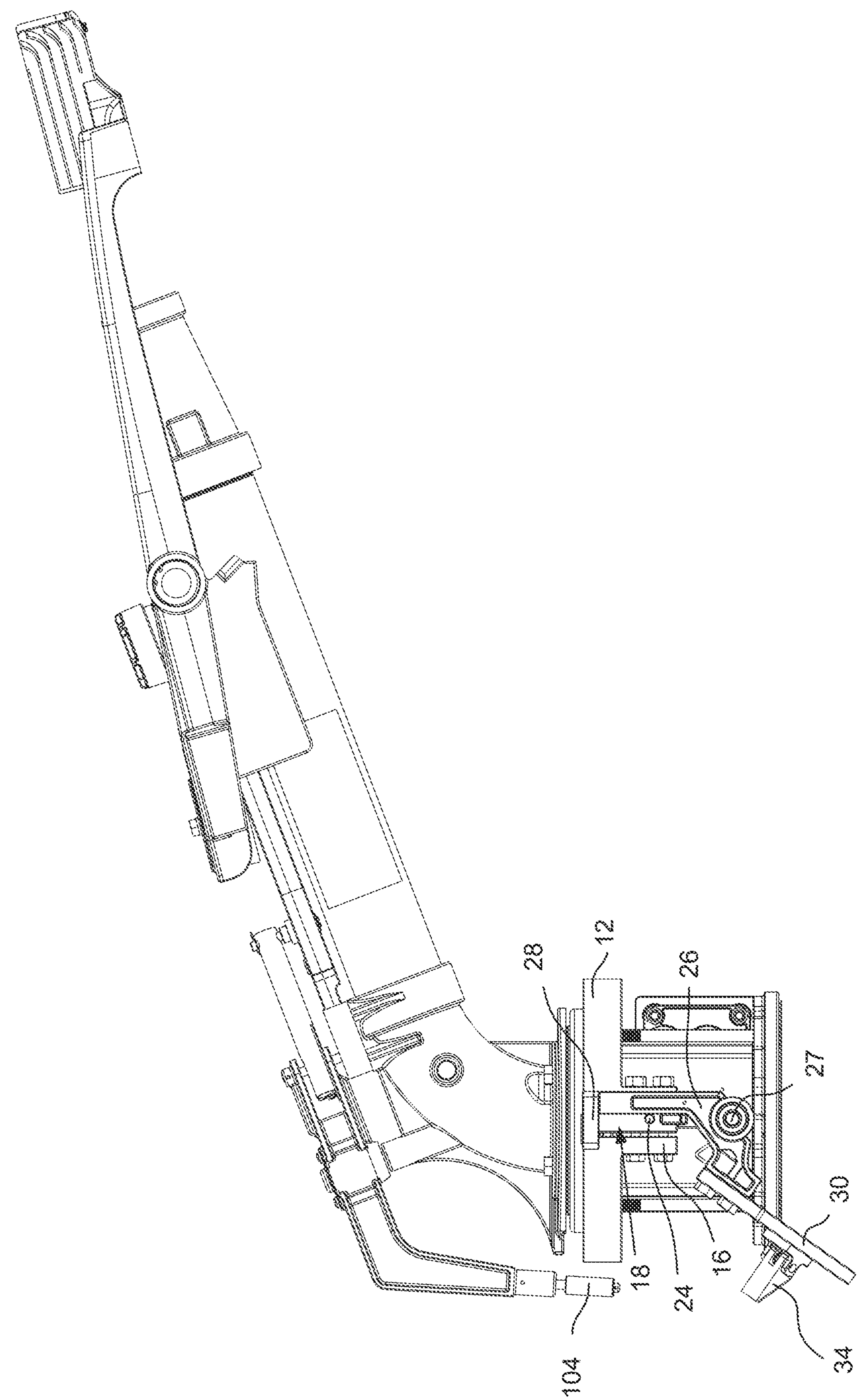
FIG. 2 is an opposite side view in the same orientation as FIG. 1.

In the first position shown in FIGS. 1-3, the primary stop members 28 are active; that is, the primary stop members 28 are positioned relative to the base cover 102 in a path of the direction change arm 104. With specific reference to FIG. 1, for example, the sprinkler is caused to rotate in a particular direction using a known directional mechanism, and in the embodiment shown in FIG. 1, the direction change arm 104 is on the right side of the sprinkler base. With the primary stop members 28 essentially diametrically opposed on opposite sides of the sprinkler base, with the automatic reversible arc assembly 10 in its first position, the sprinkler spans an arc of the base cover 102 on the right side of the base cover (in FIG. 1) encompassing, for example, 180 degrees. With the assembly 10 pivoted to its second position (as shown in FIGS. 4 and 5), the secondary stop members 34 are active; that is, in the second position, the secondary stop members 34 are positioned in a path of the direction change arm 104 of the sprinkler. In this configuration, the sprinkler spans an arc of the base cover 102 on an opposite side (the left side in FIG. 4) of the base cover up to 320 degrees. This span is adjustable due to the adjustability of the secondary stop members 34 in the slots 36. The primary stop members 28 and the secondary stop members 34 are thus coupled together via the stop assembly mounting plate 30 and define a pivot assembly that is pivotable between the first position and the second position.

The sprinkler arc with the assembly 10 in the second position at least partially overlaps the sprinkler arc with the assembly 10 in the first position on an opposite side of the base cover 102. In this context, the secondary stop members 34 may be unidirectional. That is, the secondary stop members 34 are each pivotable between an upright position and a deflected position, where the secondary stop members 34 are biased toward the upright position (by a spring or the like). With this structure, if the direction change arm 104 is outside of the arc defined by the secondary stop members 34 when the assembly 10 is pivoted from the first position to the second position, as the direction change arm 104 impacts an opposite side of one of the secondary stop members 34, the direction change arm 104 will deflect the engaged secondary stop member 34 and pass over the secondary stop member 34 into the arc defined by the secondary stop members 34.

In use, the automatic reversible arc assembly of the described embodiments allows the irrigator to place the sprinkler adjacent the road and operate the sprinkler in a 180-degree arc facing back into the field. This allows all the field to be irrigated by the hose reel without getting water on a public road. After extending the traveling hose reel, the sprinkler is set facing away from the road and into the field to be irrigated. The irrigator pivots the stop assembly mounting plate 30 into the first position, and setting the timer module 38 serves to engage the timer latch 40 with the latch pin 24 to thereby secure the assembly in the first position. That is, the first position is achieved by rotating the assembly 10 downward so that the timer latch 40 clears the latching pin 24. Once the latching pin 24 clears the timer latch 40, the timer is rotated to engage the timer latch 40 with the latching pin 24, thereby fixing the assembly in the first position. The timer is set by the operator to the length of the time that the sprinkler will operate in the 180-degree arc setting. The timer is set so that the sprinkler will reverse directions far enough from the edge of the field so as to prevent water from spraying on the adjacent road. In an exemplary embodiment, the timer module 38 may have a range from a few minutes up to four or eight hours.

When the timer expires, the timer latch 40 releases the latch pin 24, and the torsion springs 20 serve to rotate and hold the stop assembly mounting plate 30 in the second position. That is, the torsion springs 20 cause the assembly 10 to pivot from the first position (FIGS. 1-3) to the second position (FIGS. 4 and 5). As noted, the secondary stop members 34 are deflectable to allow the direction change arm 104 to rotate over the back side of the stop members 34 if the direction change arm 104 is positioned on the wrong side of the secondary stop members 34 when the stop assembly mounting plate 30 is displaced into the second position after the timer expires.

The assembly 10 may be retrofit to any size sprinkler. The ring mounts 12 may be sized to accommodate varying base covers or other non-moving parts of existing sprinklers.

With the automatic reversible arc assembly of the described embodiments, a system utilizing a traveling hose reel adjacent a public road can irrigate the entire field without getting water on the public road. The assembly prevents the sprinkler from getting water onto the public road for a preset time period, after which the sprinkler arc is modified to officially cover a wider area of the field. In an exemplary construction, a 270-degree arc is used so that the sprinkler does not irrigate over the traveling hose and create wheel tracks from the cart.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An automatic reversible arc assembly for a sprinkler including a change arm that is displaceable in a path that defines a change arm plane, the automatic reversible arc assembly comprising:

a pair of primary stop members circumferentially spaced from each other by a first amount;

a pair of secondary stop members circumferentially spaced from each other by a second amount; and a timer module cooperable with the primary and secondary stop members, the timer module being configured to hold the primary and secondary stop members in a first position in which the primary stop members are active and disposed in the change arm plane and the secondary stop members are inactive and spaced from the change arm plane for a selectable period of time, after which the timer module is configured to effect displacement of the primary and secondary stop members to a second position in which the primary stop members are inactive and spaced from the change arm plane and the secondary stop members are active and disposed in the change arm plane.

2. An assembly according to claim 1, wherein the second amount is different from the first amount.

3. An assembly according to claim 2, wherein the sprinkler is displaceable in a circle, wherein the first amount spans an arc on one side of the circle, and wherein the second amount spans an arc on an opposite side of the circle.

4. An assembly according to claim 3, wherein the arc on the opposite side of the circle spanned by the second amount at least partially overlaps the arc on the one side of the circle spanned by the first amount.

5. An assembly according to claim 4, wherein the first amount spans an arc encompassing 180 degrees, and wherein the second amount spans an arc encompassing up to 320 degrees.

6. An assembly according to claim 1, wherein the primary stop members and the secondary stop members are coupled together and define a pivot assembly pivotable between the first position and the second position.

7. An assembly according to claim 1, wherein the secondary stop members are adjustable such that the second amount is selectively adjustable.

8. An assembly according to claim 1, wherein the secondary stop members are unidirectional.

9. An assembly according to claim 8, wherein the secondary stop members are each pivotable between an upright position and a deflected position, the secondary stop members being biased toward the upright position by a spring.

10. An automatic reversible arc assembly for a sprinkler comprising:

a pair of primary stop members circumferentially spaced from each other by a first amount;

a pair of secondary stop members circumferentially spaced from each other by a second amount; and a timer module cooperable with the primary and secondary stop members, the timer module being configured to hold the primary and secondary stop members in a first position in which the primary stop members are active and the secondary stop members are inactive for a selectable period of time, after which the timer module is configured to effect displacement of the primary and secondary stop members to a second position in which the primary stop members are inactive and the secondary stop members are active, wherein the primary stop members and the secondary stop members are coupled together and define a pivot assembly pivotable between the first position and the second position, and wherein the pivot assembly is biased toward the second position by a spring.

11. A method for automatically modifying a sprinkler arc for a sprinkler including a change arm that is displaceable in a path that defines a change arm plane with an automatic reversible arc assembly including a pair of primary stop members circumferentially spaced from each other by a first amount, and a pair of secondary stop members circumferentially spaced from each other by a second amount, the method comprising:

(a) securing the primary stop members in an active position in the change arm plane for a selectable period of time;

(b) a timer module enabling displacement of the primary stop members from the active position to an inactive position spaced from the change arm plane after expiration of the period of time; and (c) the timer module enabling displacement of the secondary stop members to a use position in the change arm plane in which the secondary stop members are active.

12. A method according to claim 11, wherein steps (b) and (c) are practiced simultaneously.

13. A method according to claim 12, wherein the primary stop members and the secondary stop members are coupled together and define a pivot assembly, and wherein the timer module enables displacement of the pivot assembly in steps (b) and (c).

14. A method according to claim 11, wherein the second amount is different from the first amount, the first amount defining a first sprinkler arc, and the second amount defining a second different sprinkler arc.

15. A method according to claim 14, wherein the sprinkler is displaceable in a circle, the method further comprising configuring the primary stop members such that first amount spans an arc on one side of the circle, and configuring the secondary stop members such that the second amount spans an arc on an opposite side of the circle.

16. A method according to claim 15, wherein the arc on the opposite side of the circle spanned by the second amount at least partially overlaps the arc on the one side of the circle spanned by the first amount.

17. A method according to claim 16, wherein the first amount spans an arc encompassing 180 degrees, and wherein the second amount spans an arc encompassing up to 320 degrees.

18. An automatic reversible arc assembly for a sprinkler comprising:

a pair of primary stop members circumferentially spaced from each other by a first amount;

a pair of secondary stop members circumferentially spaced from each other by a second amount;

a direction change arm configured to interact with either the pair of primary stop members or the pair of secondary stop members, wherein a path of the direction change arm defines a change arm plane; and an actuator operable to maintain the primary and secondary stop members in a first position in which the primary members are disposed in the change arm plane to interact with the direction change arm, and to maintain the primary and secondary stop members in a second position in which the secondary stop members are disposed in the change arm plane to interact with the direction change arm.

19. An assembly according to claim 18, wherein the primary stop members and the secondary stop members are coupled together and define a pivot assembly pivotable between the first position and the second position.

20. An assembly according to claim 19, wherein the secondary stop members are each pivotable between an upright position and a deflected position, the secondary stop members being biased toward the upright position by a spring.

* * * * *